United States Patent [19]

Giesenberg

[11] 4,354,394
[45] Oct. 19, 1982

[54] DEVICE FOR RIGHTING AND STABILIZING A GYRO VERTICAL

[75] Inventor: Peter Giesenberg, Uhldingen-Mühlhofen, Fed. Rep. of Germany

[73] Assignee: Bodenseewerk Geratetechnik GmbH, Uberlingen, Fed. Rep. of Germany

[21] Appl. No.: 185,392

[22] Filed: Sep. 8, 1980

[30] Foreign Application Priority Data

May 1, 1980 [DE] Fed. Rep. of Germany ....... 3000265

[51] Int. Cl.$^3$ ............................................. G01C 19/50
[52] U.S. Cl. .......................................... 74/5.44; 74/5.8
[58] Field of Search ........................... 74/5.44, 5.5, 5.8

[56] References Cited

U.S. PATENT DOCUMENTS 2,446,727  8/1948  Strother ............................... 74/5.44
4,294,128  10/1981  Giesenberg ......................... 74/5.44

Primary Examiner—Rodney H. Bonck
Attorney, Agent, or Firm—Howard H. Darbo

[57] ABSTRACT

The invention relates to a device for righting and stabilizing a gyro vertical comprising: a disc arranged on the gyro housing and perpendicular to the gyro spin axis to be driven in the same sense as the gyro rotor, a cavity provided in the disc and a liquid drop movable in the cavity, the cavity being formed such that the liquid drop, with an inclination of the gyro spin axis with respect to the vertical, flows downhill into an edge portion of the cavity remote from the gyro spin axis, in which cavity it is taken along and lifted by the wall of the cavity in an angle range, thereby producing a righting torque.

6 Claims, 4 Drawing Figures

DEVICE FOR RIGHTING AND STABILIZING A GYRO VERTICAL

From U.S. Pat. No. 4,294,128, an equipment for righting and stabilising a gyro vertical is known, wherein a disc is arranged on the gyro housing and perpendicular to the gyro spin axis to be driven in the same sense as the gyro rotor but at a reduced speed compared thereto. In the disc a cavity is formed in form of a s-shaped guide-way. The radially outer end of this guide-way extends substantially in circumferential direction against the sense of rotation of the disc. The guideway is directed laterally past the gyro spin axis and the radial inner side extends around the gyro spin axis to a point located near the gyro spin axis. In this guide-way a mercury drop is guided freely movable. In a sloping position of the disc the mercury drop flows in the guideway out of its inner end downwards into the outer end and is then "dredged up" by this in a 180°-angle range extending nearly from the line of dip again to the line of dip. Then the mercury drop flows into the inner end of the guideway now located downwards and is retained in this end throughout the next 180°-angle range of the rotation of the disc. In the embodiment illustrated in U.S. Pat. No. 4,294,128, two such separate s-shaped guideways are arranged centrosymmetrical with respect to the gyro spin axis, and alternate with the described cyclic course.

The disc is not balanced because of the mercury drop and the gravity exerts a torque on the gyro. This torque acts in such an angle range with respect to the deflection of the gyro spin axis, that it causes a precession of the gyro to align the gyro spin axis with the vertical.

In the prior art arrangement following problems are presented:

Preferably mercury is used as liquid for the liquid drop, which has a high specific weight, such that the liquid drop effects a rather high righting torque in eccentric position. Mercury, however has a high surface tension.

With small deviation of the gyro spin axis from the vertical, the mercury does not flow any more in the described way alternatingly from one end of the guideway into the other, but is retained by the friction in the guideway. The changing gravity component, occurring with the rotary motion of the disc, only causes a pulsation of the mercury drop. The surface tension acts against this pulsation of the mercury drop. Also the masses moved thereby are rather small.

That is why the gyro is rightened very slowly in the end range with small deviations of the gyro spin axis from the vertical.

Compared thereto it is the object of the invention to improve the righting speed in the device defined at the beginning.

According to the invention this object is achieved in that (a) the cavity is arranged centrosymmetrically to the gyro spin axis and (b) the surface of the liquid drop is increased in central position in the cavity as compared to the surface resulting in an eccentric position of the liquid drop.

With exactly vertically aligned spin axis and horizontal disc, the liquid drop is located centrally in the cavity, whereby it has a rather large surface because of the shape of the cavity. When the spin axis drifts a little out of the vertical, the liquid drop flows into the eccentric position. This motion is supported in the arrangement according to the invention by the surface tension and the tendency of the liquid drop to shrink and to decrease its surface. Because of the same reason, the surface tension also supports the pulsation of the liquid drop with very small deviations. According to the invention the surface tension, which restrained the righting process in the arrangement mentioned above with respect to the prior art, is used for accelerating the righting process and for increasing the precision of the righting.

Further modifications of the invention are subject matter of the sub-claims.

An embodiment of the invention will now be described in greater detail with reference to the accompanying drawings.

Figure 1:
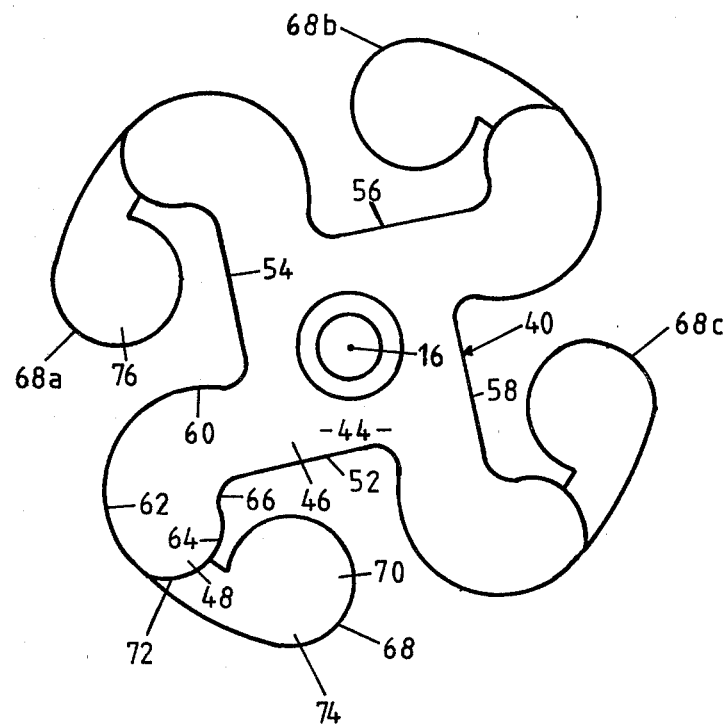
FIG. 1 shows the shape of a cavity provided in the disc.

Numeral 12 designates the invention for righting and stabilising a gyro vertical 10. It comprises a disc 14, which is arranged concentric and perpendicular to the spin axis 16 of the gyro vertical. The disc 14 is mounted on a pin 20 provided on the housing 18 of the gyro vertical 10 for rotation about the spin axis 16. The gyro vertical 10 comprises an inner stator 22 stationary with respect to the housing and an outer rotor 24, which is mounted in bearings 26, 28 in the housing 18. The rotor 24 carries a gear 30, which meshes with a gear 32. The gear 32 is connected to a gear 34, which meshes with a gear 36 on the disc 14. In this way the disc 14 together with the rotor 24 of the gyro vertical is driven with large step down ratio. The gyro housing 18 has trunnions 38 extending perpendicular to the gyro spin axis.

As can be seen best from FIG. 1, the disc 14, has a cavity 40, which is arranged centrosymmetric to the gyro spin axis 16. The cavity 40 comprises a liquid drop 42, the volume of the liquid drop and the shape of the cavity 40 being such that the surface of the liquid drop 42 is increased in central position in the cavity 40 as compared to the surface resulting in an eccentric position of the liquid drop 42. The liquid drop is preferably a mercury drop, that is it consists of a liquid with high specific weight and high surface tension. This surface tension is to be used for improving the righting.

For this purpose the cavity 40 has a central chamber 44 which in the embodiment as shown basically forms a square. From this central chamber conduits 46 extend towards the exterior.

Figure 3:
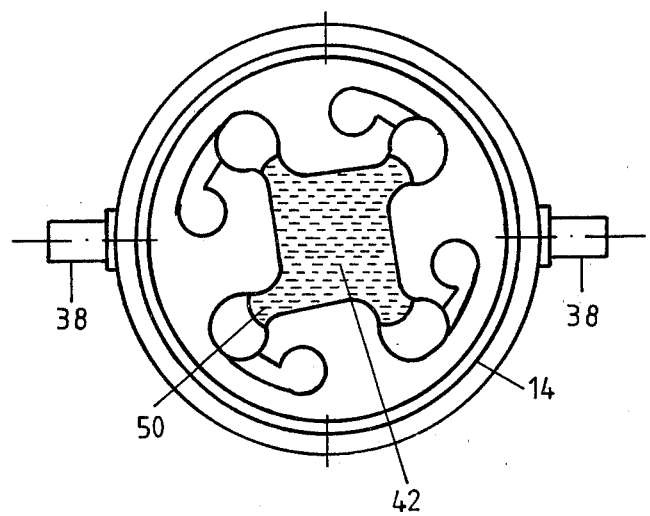
FIG. 3 is a plan view of the gyro with the righting arrangement, with the cover of the righting device removed.

These conduits 46 open at their outer ends into outer chambers 48. The outer chambers 48 extend from the conduits 46 substantially in circumferential direction against the sense of rotation of the disc 14. The volume of the liquid drop 42 is larger then the volume of the central chamber 44. If the gyro spin axis 16 is exactly vertical and the disc 14 is exactly horizontal, and thus the liquid drop 42 is located centrally in the cavity 40, then the liquid drop cannot contract to a ball under the action of the surface tension. As can be seen from FIG. 3 it has rather a rectangular form with projections 50 extending into the conduits 46. Thereby its surface is rather large and the surface tension tends to decrease the surface.

If the gyro spin axis is inclined a little against the vertical, the mercury will flow out of the central chamber 44 through a conduit 46 into one of the outer chambers 48. In this outer chamber 48 or some outer chambers the liquid drop can adopt a shape of substantially smaller surface. Thereby the surface tension supports the motion of the liquid drop 42 into the outer chamber 48. The liquid drop already with small deviations of the gyro spin axis 16 from the vertical "jumps" into the outer chamber 48 and causes an appropriately large torque on the gyro vertical 10.

In the outer chamber 48 the liquid drop 42 is taken along through an angle range extending over 180° nearly from the line of dip again to the line of dip. In this angle range the liquid drop 42 exerts a torque on the gyro vertical 10, which precesses the gyro spin axis 16 to the vertical.

The form of the cavity 40 can be seen best from FIG. 1.

The central chamber 44 is defined by four straight wall portions 52, 54, 56, 58, where neigbouring wall portions, for example 52 and 54, are mutually perpendicular, such that the central chamber 44 has generally rectangular shape. Each of the straight wall portions, for example 52, extends on one side beyond the plane of the neighbouring straight wall portion for example 54 and thus forms a side wall of the conduit 46 extending therebetween from the edge of the central portion 44. On the opposite side each conduit 46 is defined by a side wall 60, which communicates with the straight wall portion 54 and is curved against the sense of rotation of the disc 14. This side wall 60 ends in a wall portion 62 of the outer chamber 48 extending substantially in the circumferential direction of the disc, which wall portion ends in a wall portion 64 extending substantially radially inwards and a wall portion 66 extending substantially in circumferential direction in the sense of rotation of the disc. The wall portions 62, 64 and 66 of the outer chamber 48 join each other continuously. The wall portion 66 ends in the straight wall portion 52. In this way the outer chamber 48 is formed, which extends from the conduit 46 against the sense of rotation of the disc 14 and which has generally oval shape.

Capturing chambers 68 communicate with the outer chambers 48, which capturing chambers extend in circumferential direction against the sense of rotation of the disc 14. The capturing chambers form a recess 70 at their end, extending radially inwards. They are separated from the outer chambers 48 by a threshold, step or ramp 72 or its ground surface has an inclination in direction of the outer chamber 48. For manufacturing reasons a simple step has been proven advantageous. The volume of the liquid drop 42 corresponds substantially to the whole accomodation capacity of all capturing chambers 68.

If the inclination of the gyro spin axis 16 to the true vertical is just small, the liquid drop 42 cannot overcome the threshold 72. It cannot flow out of the outer chamber 48 into the capturing chamber 68. The mode of operation of the arrangement is then such as described above, that is the liquid drop 42 flows into the outer chamber placed downwards, is taken along for nearly 180° and flows then back into the central chamber 44.

When the inclination of the gyro spin axis exceeds a defined value, for example when an apparent vertical deviating from the true vertical results during turns of an airplane, then the liquid drop 42 overcomes the threshold 72 and flows into the capturing chamber 68. Liquid, which is not accommodated by one capturing chamber 68 flows back with further rotation of the disc 14 through the conduit 46 and into another outer chamber 48 and capturing chamber 68. After a complete rotation of the disc 14 the liquid is distributed to the capturing chambers 68. In the capturing chambers 68 the liquid rests captured as long as the inclination of the gyro spin axis 16 as compared to the observed vertical direction exceeds the said predetermined value.

During the rotary motion of the disc 14 the liquid passed into the capturing chambers 68 flows along the walls of the capturing chambers 68. In the lower capturing chamber in FIG. 1 with an inclination of the disc 14 about a plane horizontal in FIG. 1 the liquid accumulates in the radially outer, lower portion 74 of the capturing chamber. When the disc 14 rotates further, the capturing chamber 68 reaches the position, which is adopted in FIG. 1 by the neighbouring capturing chamber 68a. In this position the liquid accumulates on the substantially radial wall portion in range 76. After another rotation of the disc 14 the capturing chamber 68 reaches the position, which is adopted by the next capturing chamber 68b. In this position the liquid accumulates in the recess 70, extending radially inwards. The liquid flows out of this recess 70 first at a position of the disc 14, at which the conduit 46 has passed already the horizontal position and is inclined slantwise upwards seen from the outer chamber 48, such that the liquid flows out of the capturing chamber 68 into the outer chamber 48, but rests in there. Upon a further rotation, upon which the conduit 46 is finally inclined downwards, the liquid also cannot flow back through this conduit 46 to the chamber 44, because it has flowed back into the capturing chamber before by overcoming the threshold.

So the liquid is retained in the capturing chambers 68 and a righting torque is prevented, until the deviation between gyro spin axis 16 and true vertical, for example after the turn has been completed, drops below the said predetermined value. Then the liquid in the position illustrated in FIG. 1 cannot flow back into the capturing chambers 68, but passes along the threshold 72, when the disc rotates further. Hereby the righting operation described above is restarted.

Figure 2:
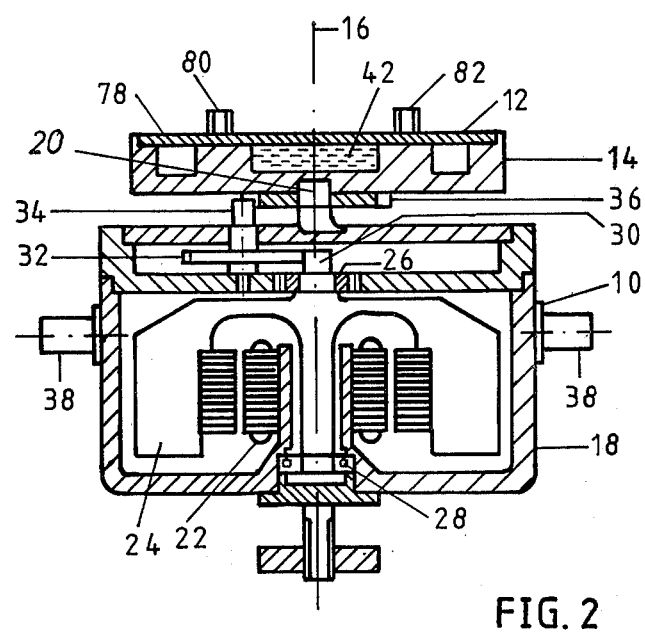
FIG. 2 shows a longitudinal view through a gyro with a righting device.

As can be seen from FIG. 2, the cavity is formed by an open recess in the disc 14, which recess is tightly covered on the upper side by cover plate 78 fixed to the disc 14 and preferably cemented therewith. Suction sockets 80, 82 are provided on the cover plate 78 and permit evacuation of the cavity or filling it with an inert gas.

Figure 4:
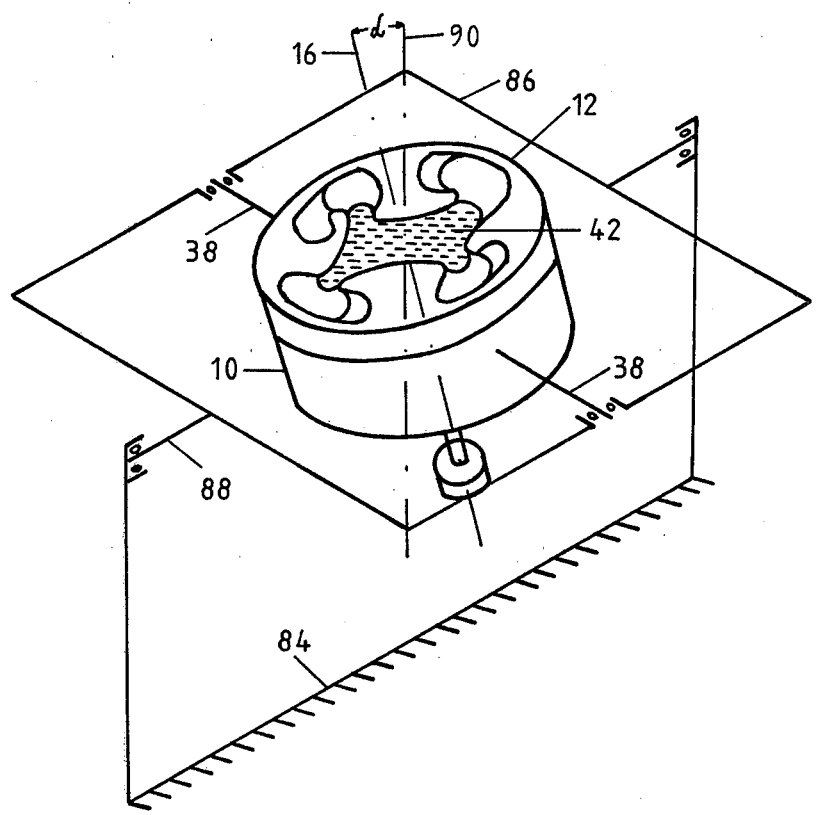
FIG. 4 is a schematic-perspective illustration of the gyro with its cardanic suspension and the righting device.

FIG. 4 shows schematically the mounting of the gyro vertical 10 in a craft, which is indicated at 84. This is effected in conventional manner by means of a gimbal 86, which is mounted in a craft for rotation about an axis 88 in which the gyro vertical 10 is also mounted rotatably about an axis perpendicular to the axis 88 by means of a trunnion 38. It is assumed, that the gyro vertical is deflected with its spin axis 16 relative to the vertical direction 90 by an angle $\alpha$, the angle $\alpha$ being illustrated in exaggerated manner.

It is advantageous, when the volume of the liquid drop 42 corresponds substantially to the whole accomodation capacity of all capturing chambers 68, 68a, 68b, 68c, that is the sum of the liquid quantities, which can be accomodated and retained by the capturing chambers without overflowing in the way described above. Then with horizontal accelerations the liquid quantity of the liquid drop 42 distributes to all capturing chambers 68, 68a, 68b, 68c such that nearly no resulting torque is exerted to the gyro 10. But also if the liquid quantity is retained for example in just one capturing chamber 68, such that the disc 14 is not balanced and could exert a torque on the gyro, this torque would be zero in the time average because of the rotation of the disc 14 and would cause nearly no drift of the gyro 10.

Instead of the four "arms" of the cavity, illustrated in FIG. 1, for example three or five such "arms" 46, 48, 68 can be provided.

I claim:

1. A device for righting and stabilizing a gyro vertical comprising:
    a disc arranged on the gyro housing, and perpendicular to the gyro spin axis, to be driven in the same sense as the gyro rotor
    a cavity provided in the disc and
    a liquid drop movable in the cavity,
    the cavity being formed such that the liquid drop, with an inclination of the gyro spin axis with respect to the vertical, flows downhill into an edge portion of the cavity remote from the gyro spin axis, in which cavity it is taken along and lifted by the wall of the cavity in an angle range, thereby producing a righting torque,
    characterized in that
    (a) the cavity (40) is arranged centrosymmetrically to the gyro spin axis (16) and
    (b) the surface of the liquid drop (42) is relatively large in the central position in the cavity (40) as compared to the surface resulting from an eccentric position of the liquid drop (42).

2. Device as set forth in claim 1, characterized in that
    (a) the cavity (40) has a central chamber (44),
    (b) conduits (46) extending outwards extend from the central chamber (44),
    (c) conduits (46) open at their outer ends into outer chambers (48),
    (d) the volume of the liquid drop (42) is larger than the volume of the central chamber (44).

3. Device as set forth in claim 2, characterized in that the outer chambers (48) extend from the conduits (46) substantially in circumferential direction against the sense of rotation of the disc (14).

4. Device as set forth in claim 2 or 3, characterized in that
    capturing chambers (68) communicate with the outer chambers (48), which capturing chambers
    (a₁) extend in circumferential direction against the sense of rotation of the disc (14),
    (a₂) form a recess (70) extending radially inwards at their ends
    (a₃) are separated from the outer chambers (48) by a threshold (72), step, rise or ramp.

5. Device as set forth in claim 2 or 3, characterized in that the wall (60, 62) of the outer chambers (48) is designed such that the liquid drop cannot flow back into the central chamber (44) with horizontal accelerations.

6. Device as set forth in claim 4, characterized in that the volume of the liquid drop (42) corresponds substantially to the whole accomodation capacity of all capturing chambers (68, 68a, 68b, 68c).

* * * * *